United States Patent [19]

Halpern et al.

[11] Patent Number: 4,531,185
[45] Date of Patent: Jul. 23, 1985

[54] CENTRALIZED SYNCHRONIZATION OF CLOCKS

[75] Inventors: Joseph Y. Halpern, Cupertino; Barbara B. Simons, Scotts Valley; Hovey R. Strong, San Jose, all of Calif.

[73] Assignee: International Business Machines Corporation, Armonk, N.Y.

[21] Appl. No.: 528,282

[22] Filed: Aug. 31, 1983

[51] Int. Cl.³ .............................................. G06F 1/04
[52] U.S. Cl. ................................................... 364/200
[58] Field of Search ......... 364/200, 300, 900 MS File

[56] References Cited

U.S. PATENT DOCUMENTS

| 3,400,371 | 9/1968 | Amdahl et al. | 364/200 |
| 3,602,900 | 8/1971 | Delaigue et al. | 364/200 |
| 3,940,743 | 2/1976 | Fitzgerald | 364/200 |
| 4,223,380 | 9/1980 | Antonaccio et al. | 364/200 |

OTHER PUBLICATIONS

Dolev et al., "A Method for Achieving Multiple Processor Agreement Optimized for No Faults", U.S. application Ser. No. 06/485,573, filed 4/18/83.
Lamport, "Time, Clocks, and the Ordering of Events in a Distributed System", 21 CACM, pp. 558-565, Jul. 1978.
Lamport et al., "Synchronizing Clocks in the Presence of Faults", SRI Technical Reports, 7/13/81.
Rivest et al., "A Method for Obtaining Digital Signatures and Public-key Cryptosystems", CACM, vol. 21, No. 2, pp. 120-126, Feb. 1978.

Primary Examiner—Raulfe B. Zache
Attorney, Agent, or Firm—R. Bruce Brodie

[57] ABSTRACT

A method for synchronizing clocks in a distributed computing system in the presence of faults. The condition to be renewed guarantees that all clocks of correct processors never deviate by more than some maximum amount. This condition is achieved by periodically resynchronizing the clocks so that the correct clocks do not deviate by more than some minimum deviation. In the process of resynchronization, a correct clock is never adjusted by more than a maximum amount during a period and it is never set back.

The method requires that there is a previously agreed upon ordered list of all participants. At a specified time in the period, the first processor on the list attempts to synchronize all to its clock. The result of this is either a synchronization of all correct processors and their clocks to be within the desired tolerance or an agreement among all other correct processors that the first node on the list has failed. If the first fails, then the second tries and so on. Assuming at most f faulty components then one of the first f+1 attempts must succeed.

8 Claims, 5 Drawing Figures

COMPLETELY CONNECTED NETWORK

CENTRALIZED SYNCHRONIZATION OF CLOCKS

TECHNICAL FIELD

This invention relates to the synchronization of clocks in a distributed computing network in the presence of faults, the network processor nodes exchanging information asynchronously.

BACKGROUND OF THE INVENTION

In distributed systems, it is assumed that each node consults its own internal clock. Since clocks in distributed systems drift apart, they must periodically be resynchronized, that is, brought very close together in value. This resynchronization is necessary to carry out many protocols for distributed systems, e.g., Strong et al.

In a seminal article, Lamport, 21 CACM, 558-565, July 1982, "Time, Clocks, and the Ordering of Events in a Distributed System", uses the concept of one event happening before another to define a partial ordering of events. Lamport describes a protocol for extending this partial ordering to a total ordering for synchronizing events and then applying this to a system of physical clocks. This guarantees that a set of correct clocks will differ by no more than a specifiable amount.

Lamport and Melliar-Smith, "Synchronizing Clocks in the Presence of Faults", SRI Technical Reports, published July 13, 1981, describe clock resynchronization in a distributed system in which each processor is required to broadcast its time value. In turn, each processor receives the clock values of every other processor, discards extreme values, and takes an average value about which to synchronize. In order to achieve clock synchronization in the presence of f faults, Lamport requires (2f+1) processors. Clock synchronization in this context is simply the condition that clocks differ by no more than a specified upper bound.

Reference should be made to Strong et al, copending U.S. Application Ser. No. 06/485/573, filed Apr. 18, 1983, entitled "A Method for Achieving Multiple Processor Agreement Optimized for No Faults". Strong describes a method for achieving Byzantine Agreement among n processors in a reliable (f+1)-connected network with guaranteed early stopping in the absence of faults and eventual stopping for f<(n/2) faults. Byzantine Agreement is a protocol which guarantees that eventually all correct processors will agree on a value. By way of contrast, clock synchronization protocols must guarantee that all correct processors agree (within a small specified margin of error) on a time.

In addition to message exchanging to achieve resynchronization, prior art protocols also have required, as previously suggested, a significant quantity of message passing. In the Lamport/Melliar-Smith case approximately $n^{f+1}$ messages are exchanged, where n is the total number of processors and f is the number of tolerable faults. Also, some systems stamp nonconcurrent events with the same time.

THE INVENTION

It is an object of this invention to devise a method for clock synchronization in a distributed computing system in the presence of faults using exchange of information. Among the related objects are that said method should achieve synchronization using reduced message traffic, and be continuously operable in a faulty environment.

The foregoing objects are achieved by a fault tolerant method for periodically synchronizing local clocks in a network of counterpart communicating CPU's, both the drift rate between the clocks and the network message transit and processing time being bounded. The method steps include (a) forming an ordered list of node identities and replicating the list at each node; (b) broadcasting a time value with its unforgeable signature to all nodes including itself by the first node on the list; and (c) multiple message exchanging of the time value among the nodes under a protocol wherein: (1) each node accepts the time value as valid and sets its clock forward if the time value is received within an interval predetermined as a function of the number of signatures, (2) otherwise repeating steps (b) and (c) as modified by broadcasting another time value from the next list node in order.

Significantly, the method is operative as long as the network is not disconnected. Relatedly, during the broadcasting of a time value and multiple phase message exchanging there is included the further step of creating new clocks and after a period of overlapping existence discarding old clocks. The difference between the new clock and old clock readings are positive and never exceed a fixed amount.

In this invention it is assumed that the clock synchronization is a periodic renewal process. The condition to be renewed guarantees that all clocks of correct processors never deviate by more than some maximum deviation. This condition is achieved by periodically resynchronizing the clocks so that the correct clocks do not deviate by more than some minimum deviation. In the process of resynchronization, a correct clock is neither adjusted by more than a maximum amount during a period nor is it ever set back. Indeed, the method of this invention requires that in each period, there is a previously agreed upon ordered list of all participants and at a specified time in the period, the first processor on the list attempts to synchronize all to its clock. The result of this is either a synchronization of all correct processors to be within the desired tolerance or an agreement among all other correct processors that the first on the list has failed. If the first fails, then the second tries, etc.

Significantly, a parameter of the method is the number of faults f to be tolerated. If the network has at least (f+1) processors and if there are no more than f faults which do not disconnect the subnetwork of correct processors, then one of the first (f+1) attempts must succeed. If the network has fewer than (f+1) processors and the subnetwork of correct processors remains connected, then synchronization will succeed in no more than n attempts, where n is the number of processors.

BRIEF DESCRIPTION OF THE DRAWING

FIGS. 2-4 consist of tasks resident on each nonfaulty processor, with at most one of the tasks not being in a wait state with the remaining one executing wherein, FIG. 2 depicts a clock monitor, FIG. 3 flow diagrams a message processing monitor, and FIG. 4 shows a task which readjusts the system if a valid message has not been received.

DESCRIPTION OF THE PREFERRED EMBODIMENT AND INDUSTRIAL APPLICABILITY

Clock Synchronization Conditions and Assumptions

Figure 1:
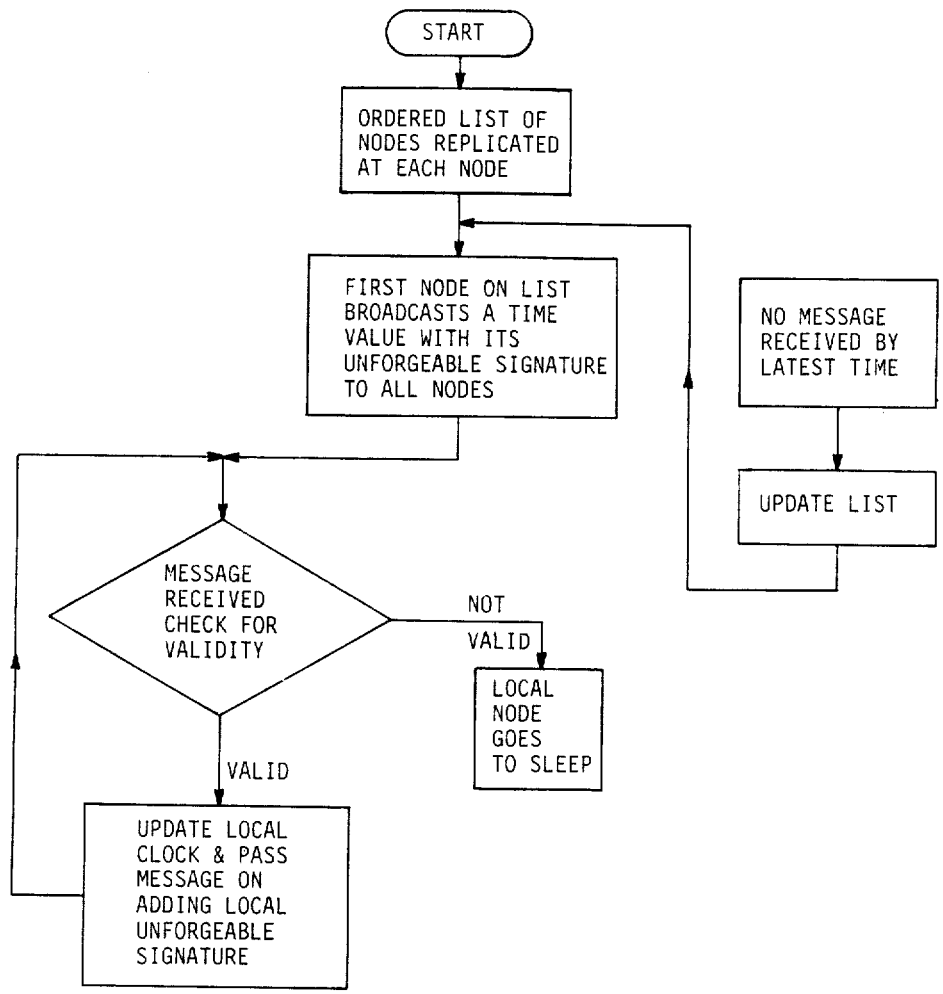
FIG. 1 exhibits a high-level decision flow of the inventive method.

It is art recognized that clock synchronization in a distributed system must be bounded in several ways. One expression of this was provided by Lamport and Melliar-Smith who stated that at any given real time, the difference between the times on any two correct processors/clocks is bounded by a constant (dmax) and at the end of each phase, the amount by which any nonfaulty clock is increased is bounded by a constant.

In this invention, distinction is made between real time as measured in an assumed Newtonian time frame that is not directly observable, and clock time, the time measured on some clock. If c is a nonfaulty clock, the notion c(t) is used to denote the time clock c read at real time t.

Let $\rho$ be used to denote a bound on the rate at which c is drifting apart from real time. For the correct functioning of this invention, it is necessary to assume the following conditions exist:

Condition No. 1

There exists a bounded rate $\rho$ at which the time on the clock of a correct processor diverges from real time. The bounded rate of drift is represented by the following relation:

$$(1+\rho)^{-1}(v-u) < c(v) - c(u) < (1+\rho)(v-u).$$

Condition No. 2

If two processors and the link joining them are nonfaulty, then there exists a known upper bound tdel (time delay) on the time required for a short message such as "the time is t" to be prepared, transmitted along the link, and processed at the receiving end.

Condition No. 3

The processors are numbered 1, 2, ..., n. If processor i intends to send a message m there is an encoding function $e_i$ such that (a) no processor other than i can generate the message $e_i[m]$. This means that no message can be forged; and (b) if processor j receives $e_i[m]$, it can decode m and determine that i was the processor that sent the message. That is, messages can be authenticated.

Condition No. 4

The rate of drift and the number of faults tolerated observe the relation:

$$1 - 2\rho(1+\rho)(f+1)(2f+1) > 0.$$

Clocks currently used are efficiently precise as to guarantee $\rho = 10^{-6}$ sec/sec for condition 1. Furthermore, a time delay of tdel = 0.1 seconds approximates instances for condition 2. The use of encryption techniques to satisfy the authenticity of a message source (unforgeability of signatures) are well known as for example Rivest et al, "A Method for Obtaining Digital Signatures and Public-key Cryptosystems", CACM, Vol. 21, No. 2, February 1978. Thus for purposes of illustration, for a $\rho = 10^{-6}$ as suggested above then faults $f \leq 498$ will satisfy condition 4. Note, that the number of faults typically is three or less in most applications.

The Local Node Execution Environment

As a preliminary, the method of this invention is executable upon a computing system of the type including one or more CPU's, each having a main store, input/output channel, control unit, direct access storage devices, local addressable clocks, and other I/O devices coupled thereto. Such a system is described in Amdahl et al, U.S. Pat. No. 3,400,371, issued Sept. 3, 1968, and entitled "Data Processing System". The Amdahl system includes as a resource, all of the facilities of either the computing system or of an operating system running thereon which are required for the execution of a process including the method of this invention. Typical resources include a main store, I/O devices, the CPU, data sets, and control or processing programs. Furthermore, such systems are capable of "multiprogramming". This pertains to the concurrent execution of two or more processes by a computing system, and can be managed on a computer running under an IBM System/370 operating system as described in IBM Publication GC28-6646, July 1973, and listed in IBM System/360 Bibliography, GA22-6822. Networks of asynchronously operating CPU's are described in Fitzgerald, U.S. Pat. No. 3,940,743, "Interconnecting Unit for Independently Operable Data Processing Systems", issued Feb. 24, 1976, and Antonacco et al, U.S. Pat. No. 4,223,380, "Distributed Multiprocessor Communication System", issued Sept. 16, 1980.

Flow Diagram Depiction of Method Execution

Referring now to FIG. 1, there is exhibited a high level decision flow of the inventive method. Residing at each processor/clock node in the network is an ordered list of nodes. First, the first node on the list broadcasts a time value with its unforgeable signature to all other nodes including itself. Next, a message exchange proceeds wherein receiving processors in the network pass such a message on with their own unforgeable signatures to all active processors including themselves. If the message is received within an interval predetermined as a function of the number of signatures, then the time value is accepted as valid and the local clock is set forward. If the time value is not received within the interval, then the first node on the list is replaced with the next node and the replacement node broadcasts an updated time value with its unforgeable signature to all nodes including itself and repeats the message exchange. The first node on the list announces to the other processors what the current time is. Because such a "synchronizer" could be faulty, the ordered list provides a method to replace such a faulty synchronizer.

Task Organization of the Method

Each processor in the network executes a collection of three tasks at least two of which are in a wait state. To further the description of this invention it is desirable to define terms involving time and clocks, characterize the relevant aspects of the network, and relate these to the task implemented method steps of the invention. After describing the invention some illustrative examples of its use are presented, first in a fault-free completely connected network and then in the same network in the presence of processor and communication link faults.

First, synchronization is modeled by starting up a new clock. After the kth synchronization, processor i will have its CLOCK(k) running. Since the processors will not be able to agree precisely on when the kth synchronization takes place, real time will be broken up into non-overlapping intervals $int_k = [beg_k, end_k]$. In this regard, $beg_k$ is the time the last nonfaulty processor decides to start its kth clock. Likewise, $end_k$ is the time that the first nonfaulty processor decides to start up its k+1st clock. Initially, all processors start their CLOCK(0) running simultaneously. For simplicity this start time is called zero. Mathematically stated, $beg_0 = CLOCK(0) = 0$ for all i. It is of course possible to have other than a simultaneous initial start. Discussion of this weakened constraint is deferred.

Typically, the length of an interval ($end_k - beg_k$) is on the order of hours while the gap between the intervals ($beg_{k+1} - end_k$) is on the order of seconds. In this invention it is not required that the gap between intervals be timed out. In this invention a processor will use its kth clock for several seconds into the (k+1)th interval to do the timing for any protocols begun in the kth interval. Even if there is a brief overlap period in which two clocks are in use, there is no ambiguity as to which clock to use since all protocols are required to be time stamped.

The following is a list of names of variables and constants global to the network, and of variables and constants local to a processor.

The variables and constants global to the network include n=the number of processors, per=synchronization period, tdel=transmission and processing worst case delay, dmax=maximum deviation of clocks, $f_1$=number of link faults tolerated, $f_p$=number of processor faults tolerated, $f = f_1 + f_p$=total number of faults tolerated, sync=current synchronizer's processor number, and et=next scheduled time of synchronization.

The variables and constants local to a particular processor include i=its unique processor number, a number in the range of 1, 2, ..., n, k=the index of current clock in the range 0, 1, 2, ..., CLOCK(0:k)=array of clocks in the range between 0 to infinity.

The functions of network topology are ntr(f), byzt(s,f), and diam($f_p,f_1$). These functions are discussed in greater detail in the General Considerations section. The primitives for task scheduling include timers, which measure duration of time, wakeup, a monitor which "wakes up" a processor upon occurrence of some event including that of a timer going off or a wake up message from some other task and wakeup-task i, a primitive which sends a "wake up" message to task i. Lastly, the initial values of all processors comprise sync=1, k=0, CLOCK(0)=0, et=the timer on task 1 of processor 1 is set to go off at per, and the timer on task 3 for all processors is set to go off at per+byzt(ntr(f),f).

The Tasks

Figure 2:
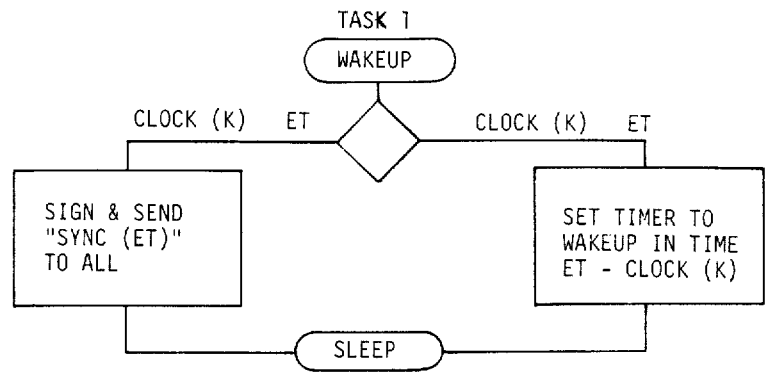

Referring now to FIG. 2, there is shown a broadcast monitor. In this task, an executing nonfaulty processor i (i ranging from 1 to n) checks to see if its current clock (CLOCK(k)) has a value greater than or equal to et. If CLOCK(k) is less than et, then processor i sets it timer to wake up at time et−CLOCK(k). If CLOCK(k) is greater than or equal to et, then processor i signs and sends out a message to all processors exclaiming "synchronize; the time is et". The message is encoded using the encoding function $e_i$ so that it cannot be forged. This task (task 1) then goes to sleep.

Figure 3:
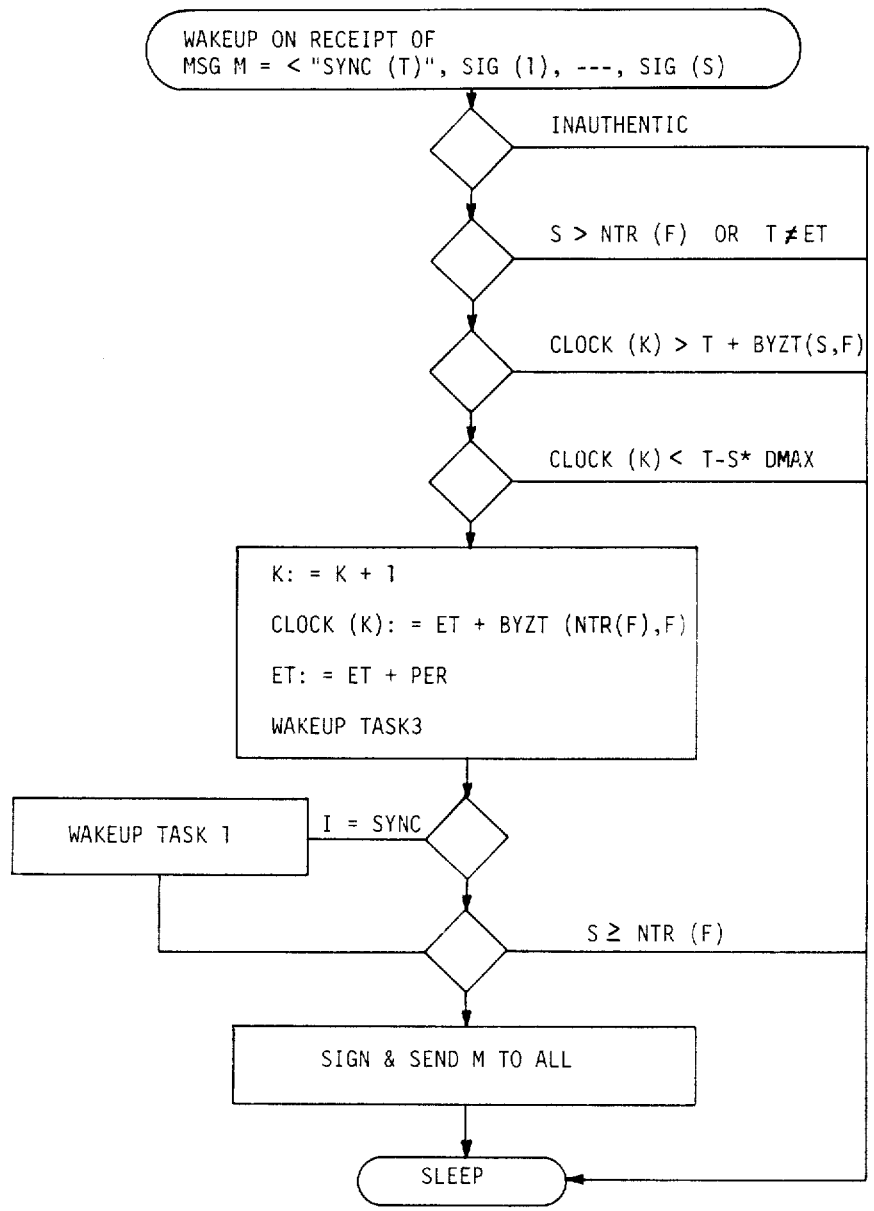

Referring now to FIG. 3, there is shown a validity monitor. If processor i receives a message saying "synchronize; the time is t", it executes a series of tests hereinafter described in order to ascertain whether the message is valid. If the answer to any of these tests is "yes", processor i ignores the message and goes to sleep.

Among the factors tested are first whether the message is authentic. That is, has the received message been properly encoded and are all the signatures distinct. Next, the message is examined as to whether it has so many signatures that it must have been received by some nonfaulty processor when there were fewer signatures on the message, or is the time given in the message different from the time which the processor is expecting. In other words, is s greater than ntr(f) or is t not equal to et.

Among the additional concerns are whether the time on the processor i's current clock is greater than the time required to do clock synchronization if the synchronizer is nonfaulty, i.e., whether CLOCK(k) is greater than t+byzt(s,f). Lastly, the processor tests whether the time on its current clock is too early for starting a new synchronization, that is, whether CLOCK(k) is less than (t−s(dmax)).

If the answer to the above questions has in each case been "no", then the message is considered valid. It follows that processor i will now perform the actual synchronization. Synchronization consists of the following steps:

1. It creates a new clock by increasing the value of k by 1. In other words, k is assigned the value k+1.

2. It starts running CLOCK(k) (which is now the new clock) by setting CLOCK(k) to a previously agreed upon start time for the new clock. Mathematically, CLOCK(k):=et+byzt(ntr(f),f). This means that the new clock has a start time greater than the current time of the old clock.

3. It sets the expected time for the next clock synchronization: et:=et+per.

4. It sends a wakeup message to task 3.

After having done the synchronization, processor i checks to see if it is the first node on the list (synchronizer). If the answer is "yes", then it issues a wake up command to task 1. Whether or not processor i is the synchronizer it signs the message and sends it to all other processors. Finally, this taks (task 2) goes to sleep.

Figure 4:
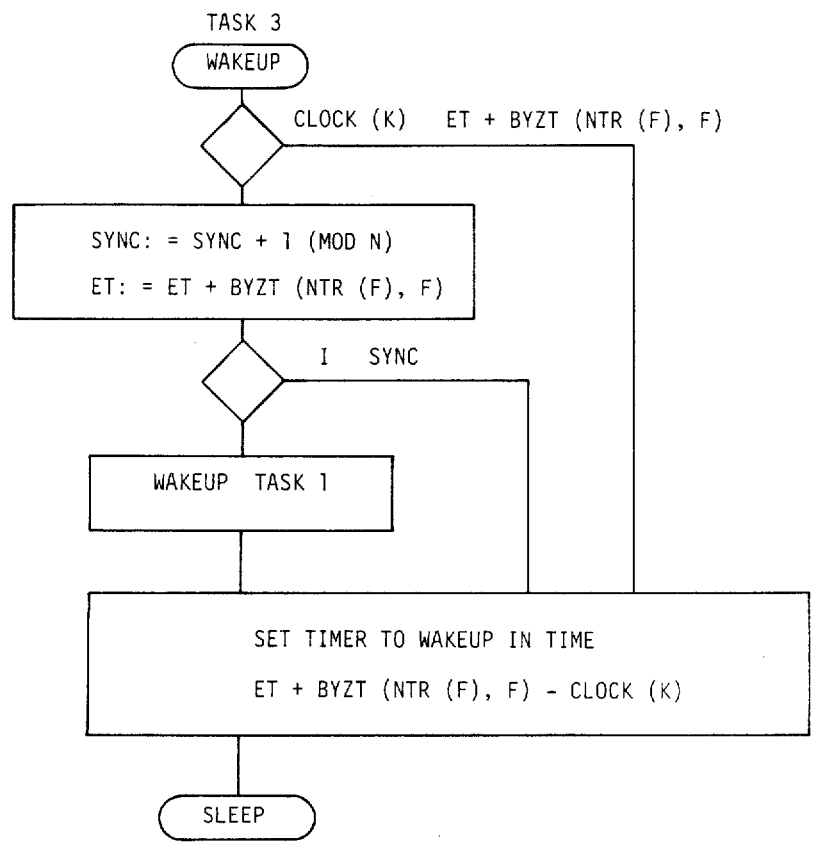

Referring now to FIG. 4, there is shown the current-synchronizer monitor. In this regard if processor i has not received a valid message in the time required to perform a synchronization, then the current synchronizer must be faulty. Consequently, processor i chooses the next synchronizer on the list and pushes the expected time of resynchronization forward. That is, if the time on processor i's current clock is less than the time required to perform a clock synchronization, then processor i sets its timer to wake up at the time by which the clock synchronization will be completed if the synchronizer is nonfaulty. Symbolically, if CLOCK(k) is less than et+byzt(ntr(f),f) then it sets its timer to wake up at time et+byzt(ntr(f),f)−CLOCK(k). Otherwise, processor i performs the following steps:

1. Processor i selects the next processor on the list to be the synchronizer. This means that sync:=sync+1#(-mod n).

2. The expected time of synchronization is increased accordingly. That is, et:=et+byzt(ntr(f),f). Processor i then checks to see if it is the synchronizer. If it is, then it issues a wake up command to task 1. Whether or not processor i is the synchronizer, it sets its timer to wake up at the time by which the clock synchronization with the new synchronizer will be completed if the new synchronizer is nonfaulty. This time is et+-byzt(ntr(f),f)−CLOCK(k).

General Considerations

It has been assumed in this discussion that there are at most f faults in the network. Additionally, it has been assumed that there exists a fixed routing between each pair of nodes in the network. Let g be a graph with the same set of nodes as the original network and with an edge between two nodes exactly when the route between those nodes is nonfaulty. It follows that graph g depends on the original network, the routing, and the set of faults. If g is not disconnected by the set of faults, then there exists a shortest path in g between any pair of nonfaulty nodes in g. Let diam($f_p,f_l$) be the longest of these shortest paths when the set of faults has $f_p$ node faults and $f_l$ link faults. That is, $f=f_p+f_l$. Consequently, the following relations hold.

(1) ntr(f) = max$_{fp,fl = f}$($f_p$ + diam($f_p,f_l$)).

(2) byzt(s,f) = min[s,f+1]·dmax + s tdel.

For a completely connected graph on n nodes, diam($f_p,f_l$) = 2 if $f_l \geq 1$ and $f_l + f_p \leq n-2$. If $f_l = 0$, that is, there are no link failures (the case considered in Lamport and Melliar-Smith), diam($f_p$,o) = 1. In both cases, ntr(f) = f+1.

Attributes of the Invention

The method steps of this invention satisfy the following properties. First, at any given time the difference between the times on any two correct processors is bounded by the constant dmax. Second, the (k+1) st clock of processor i is started at some time in the interval [end$_k$, beg$_{k+1}$]. Its initial time is later than that of CLOCK(k) but only by at most the bounded amount 2(f+1) dmax + ntr(f) tdel. Third, each interval will have a duration roughly equal to per. Lastly, the gap between the time at which the first processor starts a new clock and the last processor starts a new clock is small. That is, it is less than diam($f_p,f_l$) × tdel.

At the beginning of each interval, the clocks of nonfaulty processors will be synchronized to be within diam($f_p,f_l$) × tdel (the gap between intervals). Since each interval has a duration approximately equal to per, they will drift apart approximately diam($f_p,f_l$) × tdel + 2pper by the end of the interval. At this point there will be a new synchronization.

Illustrative Examples of the Method

It should be appreciated that the method of this invention requires that resynchronization be done periodically. It should be recalled that the time between resynchronizations depends upon the maxumum delay for a message to go from one participant in the synchronization protocol to another, on the maximum rate of drift of individual clocks and on the number of faults that occur during resynchronization. As an example of the behavior of the method in a completely connected network assume 4 nodes, a maximum transmission delay of 100 milliseconds, a maximum clock drift of one second in every million seconds and a fault tolerance of 2. Assume that resynchronization is required every hour, and the maximum difference permitted between correct clocks is 300 milliseconds.

Figure 5:
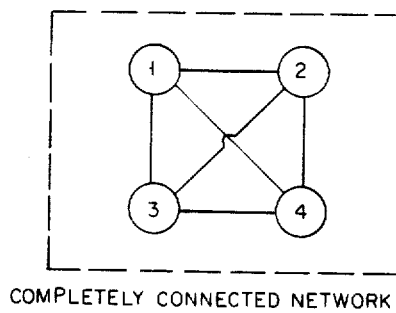
FIG. 5 exhibits a four node completely connected network of processors and local clocks.

The processors are numbered 1, 2, 3, 4 as depicted in FIG. 5. This numbering also represents the ordered list of synchronizers. Initially there are no faults, and the clocks are all synchronized to 12:00 midnight and et=1:00 a.m. At 1:00 a.m. on processor 1's clock, processor 1 begins a new synchronization by encoding and sending to all processors the message "synchronize; the time is 1:00 a.m." The clocks will have drifted apart at most 7.2 milliseconds during the hour. They will receive the message within 100 milliseconds of when it was sent (since there are no faults). They will quickly verify that the message is valid, and so set a new clock to read 1:00 a.m. + 1.2 seconds. The next expected time of synchronization is set to 2:00 a.m. + 1.2 seconds.

Now suppose that processor 1's clock starts to run fast and the communication link between processors 2 and 3 goes down. At 2:00 a.m. + 1.2 seconds on its clock, processor 1 begins another synchronization by encoding and sending to all processors the message "synchronize; the time is 2:00 a.m. + 1.2 seconds". But since processor 1's clock has been running fast, all the other processors receive this message when their clocks read between 1:55 and 1:56 a.m. The message will not pass the validity check, since it arrives too early, so it will be ignored and the validity monitor will go to sleep. At time 2:00 a.m. + 2.4 seconds on each of the clocks, the current-synchronizer monitor of processors 2, 3, and 4 will wake up and see that no valid message has been received during the interval. Processor 1 will be declared faulty and processor 2 will become the current synchronizer. The current-synchronizer monitor of processor 2 will issue a wakeup command to its task 1: the broadcast monitor. Then processor 2 will encode and send out to all processors the message "synchronize; the time is 2:00 a.m. + 2.4 seconds". Processor 4 will receive the message and consider it valid. Processor 3 will not receive the message from processor 2 since the communication link between them is still down. However, since processor 4 does receive the message and considers it valid, it will encode, sign, and send it out to all processors. Since the link between processor 4 and processor 3 is nonfaulty, processor 3 will receive the message from processor 4 and consider it valid. Thus, processors 2, 3, and 4 will all receive a valid message and resynchronize within a time period of 2·tdel = 200 milliseconds. Since processor 1 is now faulty, we do not require that it also resynchronize.

The three enumerated tasks 1-3, as shown in FIGS. 2-4, are expressible in a high-level programming language such as PL/I. In this regard, PL/I is fully described in IBM Systems Reference Library Manual S360-29, Catalog No. GC28-8201-4, Fifth Edition, copyrighted December 1972. Reference also should be made to the aforementioned copending Strong et al, U.S. Application Ser. No. 06/485,573, filed Apr. 18, 1983, for a discussion of the attributes of monitors, especially wakeup, broadcast, and Byzantine monitors and their implementation in each local node processor execution environment. Lastly, it should be noted that selected portions of both the broadcast and Byzantine monitor set out in Strong may be used for respectively broadcasting and multiple phase message exchanging among other nodes. The point in part is that the multiple message exchange is not necessarily limited to a Byzantine protocol.

A representation of tasks 1-3 written in a PL/I subset is appended to this specification respectively as counterpart tables 1-3. As is customary program expository practice, the instructions occupy the left side of the page with the right side containing comment fields as required. The inclusion of these executable monitors is set forth in order to illustrate, by way of example, the ease with which the method of this invention may be practiced by those possessing skill in this art. Other high-level language representation such as PASCAL or ADA might likewise with equal ease and facility have been drawn.

TABLE 1

```
DCFMSYMN:  PROC OPTIONS(ID);
/*                                                                              */
/*                      DCFMSYMN                                                */
/*   MONITOR TASK FOR CLOCK SYNCHRONIZATION                                     */
/*   THIS PROCEDURE SENDS A CLOCK SYNCHRONIZATION MESSAGE VIA                   */
/*   BYZANTINE PROCESSING.                                                      */
/*                                                                              */
%INCLUDE SYSLIB(DCFMFRAM);
%INCLUDE SYSLIB(DCFMGVAR);
%INCLUDE SYSLIB(DCFMMASK);
%INCLUDE SYSLIB(DCFMCLTA);
%INCLUDE SYSLIB(DCFMHSLO);
%INCLUDE SYSLIB(DCFMBYZB);
%INCLUDE SYSLIB(PXUOLCBM);
DCL BSLT CHAR(4) ;              /*  NAME OF BY       SLOT                  */
DCL FFP    POINTER(31);         /*  PTR TO CURRENT MESSAGE                 */
DCL BYZBP POINTER(31);          /*  PTR TO CONTIG              BYZB        */
DCL BP     POINTER(31);         /*  PTR TO DISCONTIG           BYZB        */
DCL ZB CHAR(LENGTH(BYZB));      /*  SPACE FOR CONTIG BYZB IF NOT ON 1      */
DCL ZL FIXED(31) INIT(LENGTH(BYZB)):      /*  LENGTH OF BYZB               */
DCL BZTP   POINTER(31);         /*  PTR TO 2D BZOL                         */
DCL QSP POINTER(31);            /*  PTR TO HASH SLOT                       */
DCL TIME FIXED(32);             /*  CURRENT TIME                           */
DCL LTIME FIXED(32);            /*  WAKE UP TIME                           */
DCL NP POINTER(31);             /*  PTR TO TARGET NAMES                    */
DCL IND FIXED(31);              /*  COUNTER                                */
DCL FOUND FIXED(31);            /*  INDICATOR                              */
DCL P POINTER(31);              /*  PTR                                    */
DCL W FIXED(31) BASED;          /*  WORD MASK                              */
DCL (I,J)       FIXED(31);      /*  COUNTERS                               */
DCL REPORT CHAR(10);            /*  DBG                                    */
RFY HSLOT BASED(QSP);
RFY BYZB BASED(BYZBP);
RFY OLCBM BASED(BZOLCBP$);
DCL OLLCBP POINTER(31);         /*  PTR TO LOCK FOR OL                     */
DCL TP POINTER(31);             /*  POINTER FOR FRAME MASK                 */
RFY FRAME BASED(TP);            /*  MASK BASED ON TP                       */
OLLCBP = ADDR(OLLCB);
BZTP = BZOLCBP$+LENGTH(OLCBM);
IF DBGSWS$(15)>=1 THEN DO;
     CALL PXUTRACE('ENTER DCFMSYMN',14);        /*  DBG    */
END;  /*  DBG   */
LOOP:
CALL DCFMTIME(1,0,TIME);        /*  PUTS TIME OF CURRENT CLOCK IN TIME     */
LTIME = CLSYET;
/*   THIS IS THE TIME TO SEND THE NEXT SYNCHRONIZATION MESSAGE             */
IF LTIME>TIME THEN I = LTIME-TIME;
ELSE I = LTIME+'FFFFFFFF'X-TIME;
IF I>'8000'X THEN I = 0;        /*  INDICATES WRAP AROUND 0                */
IF I>0 THEN DO;                 /*  NOT TIME TO PROCESS YET                */
     I = I*7;                   /*  CONVERT TO TIMER UNITS (6.5)           */
     IF DBGSWS$(15)>=1 THEN DO;
          CALL PXUTRACE('DCFMSYMN SETS TIMER',19);      /*  DBG   */
          CALL PXUDHEX(I,4);  /*  DBG   */
          CALL PXUDHEX(LTIME,4);  /*  DBG   */
          CALL PXUDHEX(TIME,4);  /*  DBG   */
     END;  /*  DBG   */
     ?PXUTIMER(I,SYMECBP$);     /*  SET TIMER                              */
     GOTO DONE;
END;   /*  OF IF LTIME>TIME   */
CH = 'SY';
BL = LENGTH(BYZB);
TP = NULL$;
CALL PXUSTPOP(FFPSCBP$,TP,DRC,DRC);     /*  GET A FRAME                    */
FRSRCN = '      ';
FRLSRC = '      ';              /*  PUT 4 BLANKS IN LTGT                   */
LL = MIN(LL,8);
?PXUMOVE(0,ADDR(LINE),0,ADDR(FRSRCN),LL);       /*  FILL IN SOURCE         */
FRNBR = 1;
FRNFRMS = 1;
FRNMSGS = 1;
FRDX = 0;
FRDEL = ' ';
FRHOP = 0;
FRMPRTY = 1;'
FRTGTN = 'BY';                  /*  DETERMINED BY SELECTION                */
ZBP = ADDR(FRTEXT);             /*  PTS TO BYZB                            */
RFY BYZB BASED(ZBP);
BYCH = CH;
```

TABLE 1-continued

```
BYT = CCLCONN;
BYN = 0;
FRCHAIN = NULL$;
FRUL = LENGTH(FRAME)+LENGTH(BYZB);
?DCFUIDG(FRMID);                 /* GENERATE MSG ID        */
CALL DCFMBY(TP,ERR);             /* BYZANTINE              */
DONE:
CALL PXURWAIT(SYMECBP$);         /* WAIT ON ECB            */
SYMECBP$->W = 0;                 /* CLEAR ECB              */
GOTO LOOP;
ERR:
IF DBGSWS$(15)-=0 THEN CALL PXUTRACE('DCFMSYMN ERROR',14);
CALL PXUSTOP(REPORT);
END DCFMSYMN ;
```

TABLE 2

```
/* DCFMBYZB COPY                                                    */
/*                                                                  */
/*                                                                  */
/* BYZANTINE INFORMATION BLOCK MASK FOR USER INTERFACE TO M LAYER   */
/* THIS BLOCK IS OPTIMIZED FOR THE NO FAULT CASE OF BYZANTINE       */
/* AGREEMENT. IF MORE THAN 2 SIGNATURES ARE NEEDED FOR ANY MSG      */
/* THEY ARE PUT AT THE END OF THE MESSAGE.                          */
/* IF BYCH IS 'BY' THEN THE IMMEDIATE AGREEMENT ALGORITHM IS USED   */
/* IF BYCH IS 'SY' THEN THE IMMEDIATE AGREEMENT ALGORITHM IS USED   */
/* IF BYCH IS 'BE' AND THERE ARE SUFFICIENT RESOURCES THEN          */
/* THE EARLY STOPPING ALGORITHM IS USED.                            */
/*                                                                  */
/*                                                                  */
DCL 1 BYZB BASED,          /* BYZANTINE INFORMATION BLOCK           */
    2 BYCH CHAR(2),        /* SRQ IND BY=IMM-BYZ BE=EARLY-STOP      */
    2 BYBT FIXED(8),       /* BYZ PARAM NUMBER FAULTS TOLERATED     */
    2 BYN FIXED(8),        /* NUMBER OF NAMES APPEARING BELOW       */
    2 BYTIME FIXED(31),    /* STARTING TIME FOR B.A.                */
    2 BYID FIXED(31),      /* AGREEMENT ID                          */
    2 BYTDEL FIXED(15),    /* TRANSMISSION DELAY                    */
    2 BYDMAX FIXED(15),    /* MAXIMUM CLOCK DEVIATION               */
    2 BYDESC,              /* DESCRIPTION OF AGREEMENT PARAMS       */
      3 BYRES CHAR(1),     /* RESOLUTION OF AGREEMENT               */
      3 BYNAC FIXED(8),    /* NUMBER OF ACTIVE NODES INVOLVED       */
      3 BYNTR FIXED(8),    /* MAX NMBR TRANSMISSIONS                */
      3 BYT FIXED(8),      /* ACTUAL BYZANTINE PARAMETER USED       */
    2 BYSIGN,              /* STATE OF SIGNATURES OF THIS MSG       */
      3 BYSIG FIXED(8),    /* TOTAL NMBR OF DISTINCT SIGNATURES     */
      3 BYNSP FIXED(8),    /* NMBR SIGNATURE PACKETS ENCLOSED       */
      3 BYCFN FIXED(8),    /* FRAME NUMBER FOR CONTINUED SIGS       */
      3 BYCOF FIXED(8),    /* OFFSET ON FRM FOR CONTINUED SIGS      */
    2 BYBITS BIT(32),      /* BIT MAP OF SIGS BY PROCESSOR NBR      */
    2 BYACBT BIT(32),      /* BIT MAP OF ACTIVE PROCESSORS          */
    2 BYISIG,              /* ORIGINATOR'S SIGNATURE                */
      3 BYINMBR FIXED(15), /* PR NUMBER OF ORIGINATOR               */
      3 BYIAUTH,           /* ORIGINATOR AUTHENTICATION             */
        4 BYINSP FIXED(8), /* THIS SHOULD BE 1                      */
        4 BYINH FIXED(8),  /* HASH OF BYINMBR                       */
        4 BYIPNH FIXED(8), /* HASH OF 1ST WORD OF TEXT              */
        4 BYIPAH FIXED(8), /* HASH OF AGREEMENT ID                  */
      3 BY2NMBR FIXED(15), /* PR NUMBER OF 1ST RECIPIENT            */
      3 BY2AUTH,           /* 1ST RECIPIENT AUTHENTICATION          */
        4 BY2NSP FIXED(8), /* THIS SHOULD BE 2                      */
        4 BY2NH FIXED(8),  /* HASH OF BY2NMBR                       */
        4 BY2PNH FIXED(8), /* HASH OF BY1AUTH                       */
        4 BY2PAH FIXED(8), /* HASH OF AGREEMENT ID                  */
```

TABLE 3

```
DCFMSMMN: PROC OPTIONS(ID);
/*                                                        */
/*                 DCFMSMMN
/* MONITOR TASK FOR CLOCK SYNCHRONIZATION FAILURE         */
/* This procedure updates CLSYNC when a syncrhonization   */
/* attempt is unsuccessful.                               */
/*                                                        */
/*                                                        */
%INCLUDE SYSLIB(DCFMFRAM);
%INCLUDE SYSLIB(DCFMGVAR);
%INCLUDE SYSLIB(DCFMMASK);
%INCLUDE SYSLIB(DCFMCLTA);
%INCLUDE SYSLIB(DCFMHSLO);
%INCLUDE SYSLIB(DCFMBYZB);
```

TABLE 3-continued

```
%INCLUDE SYSLIB(PXUOLCBM);
DCL BSLT CHAR(4) ;              /* NAME OF BY      SLOT                */
DCL FFP    POINTER(31);         /* PTR TO CURRENT MESSAGE              */
DCL BYZBP POINTER(31);          /* PTR TO CONTIG         BYZB          */
DCL BP     POINTER(31);         /* PTR TO DISCONTIG      BYZB          */
DCL ZB CHAR(LENGTH(BYZB));      /* SPACE FOR CONTIG BYZB IF NOT ON 1   */
DCL ZL FIXED(31) INIT(LENGTH(BYZB));   /* LENGTH OF BYZB               */
DCL BZTP   POINTER(31);         /* PTR TO 2D BZOL                      */
DCL QSP POINTER(31);            /* PTR TO HASH SLOT                    */
DCL TIME FIXED(32);             /* CURRENT TIME                        */
DCL LTIME FIXED(32);            /* WAKE UP TIME                        */
DCL NP POINTER(31);             /* PTR TO TARGET NAMES                 */
DCL IND FIXED(31);              /* COUNTER                             */
DCL FOUND FIXED(31);            /* INDICATOR                           */
DCL P POINTER(31);              /* PTR                                 */
DCL W FIXED(31) BASED;          /* WORD MASK                           */
DCL (I,J)      FIXED(31);       /* COUNTERS                            */
DCL REPORT CHAR(10);            /* DBG                                 */
RFY HSLOT BASED(QSP);
RFY BYZB BASED(BYZBP);
RFY OLCBM BASED(BZOLCBP$);
DCL OLLCBP POINTER(31);         /* PTR TO LOCK FOR OL                  */
DCL TP POINTER(31);                /* POINTER FOR FRAME MASK           */
RFY FRAME BASED(TP);            /* MASK BASED ON TP                    */
OLLCBP = ADDR(OLLCB);
BZTP = BZOLCBP$+LENGTH(OLCBM);
IF DBGSWS$(15)> = 1 THEN DO;
    CALL PXUTRACE('ENTER DCFMSYMN',14);    /* DBG */
END; /* DBG */
LOOP:
CALL DCFMTIME(1,0,TIME);        /* PUTS TIME OF CURRENT CLOCK IN TIME  */
LTIME = CLSYET;
/* THIS IS THE TIME TO SEND THE NEXT SYNCHRONIZATION MESSAGE           */
IF LTIME>TIME THEN I = LTIME-TIME;
ELSE I = LTIME+'FFFFFFFF'X-TIME;
IF I>'8000'X THEN I = 0;        /* INDICATES WRAP AROUND 0             */
IF I>0 THEN DO;                 /* NOT TIME TO PROCESS YET             */
    I = I*7;                    /* CONVERT TO TIMER UNITS (6.5)        */
    IF DBGSWS$(15)> = 1 THEN DO;
        CALL PXUTRACE('DCFMSYMN SETS TIMER',19);    /* DBG */
        CALL PXUDHEX(I,4);  /* DBG */
        CALL PXUDHEX(LTIME,4);  /* DBG */
        CALL PXUDHEX(TIME,4); /* DBG */
    END; /* DBG */
    ?PXUTIMER(I,SYMECBP$);      /* SET TIMER                           */
    GOTO DONE;
END; /* OF IF LTIME>TIME */
I = MYNBR$;                     /* THIS PROCESSOR NUMBER               */
P = PNTP$+LENGTH(CLTABL);       /* PTS TO CLNTABL                      */
J = MIN(LENGTH(BYACBT),P- CLHIGHN);   /* LARGEST CLSYNC PERMITTED      */
CLSYNC = CLSYNC +1;             /* NEW CURRENT SYNCHRONIZER            */
IF CLSYNC>J THEN CLSYNC-1;      /* WRAP AROUND                         */
CLSYET = LTIME;                 /* NEXT ATTEMPT                        */
IF CLSYNC=MYNBR$ THEN CALL PXUFPOST(SYMECBP$,0);     /* SCHEDULE NEXT  */
GOTO LOOP;
DONE:
CALL PXURWAIT(SMMECBP$);        /* WAIT ON ECB POSTED BY DCFMUPTI      */
SMMECBP$->W = 0;                /* CLEAR ECB                           */
GOTOLOOP:
ERR:
IF DBGSWS$(15)-=0 THEN CALL PXUTRACE('DCFMSMMN ERROR',14);
CALL PXUSTOP(REPORT);
END DCFMSMMN ;
```

Having shown and described one embodiment of this invention, those skilled in this art will appreciate that many variations and modifications can be made to practice the invention and still be within the spirit and scope thereof. Thus, the invention is intended to be limited only by the claimed matter as indicated in the attached claim set.

We claim:

1. A method for periodically synchronizing local clocks in a network of counterpart communicating CPU's (nodes), both the drift rate between the clocks and the network message transit and processing time being bounded, comprising the steps of:

(a) forming an ordered list of node identities and replicating the list at each node;

(b) broadcasting a time value with its unforgeable signature to all nodes including itself by the first node on the list; and (c) multiple message exchanging of the time value among the nodes wherein either a value convergence is secured or the next node on the list broadcasts another time value in the manner of the first and submits to a multiple message exchanging, the process repeating until synchronization is achieved.

2. A fault tolerant method for periodically synchronizing the local clocks in a network of counterpart communicating CPU's (nodes), both the drift rate between the clocks and the network message transit and processing time being bounded, comprising the steps of:
  (a) forming an ordered list of node identities and replicating the list at each node;
  (b) broadcasting a time value with its unforgeable signature to all nodes including itself by the first node on the list; and
  (c) multiple message exchanging of the time value among the nodes wherein:
    (1) each node accepts the time value as valid and sets its clock forward if the time value is received within an interval predetermined as a function of the number of signatures,
    (2) otherwise repeating steps (b) and (c) as modified by broadcasting another time value from the next node in the list in order.

3. A method according to claim 2, wherein the network includes n nodes and tolerant of up to f faults which do not disconnect the network.

4. A method according to claim 2, wherein during the broadcasting of a time value and multiple message exchanging steps further includes the steps of creating new clocks and after a period of overlapping existence discarding the old clocks, the difference between the new clock and old clock readings being positive and never exceeding a fixed amount.

5. A method according to claim 2, wherein for a network of n nodes the number of messages required to reach synchronization is at most $n^2$.

6. A method according to claim 1 or claim 2, wherein
  the step of broadcasting a time value with its unforgeable signature by node i includes the steps of operating upon the time value message m by way of an encoding function $e_i$ such that no processor other than the first node can generate the time value $e_i[m]$;
  the step of multiple phase message exchanging of the time value among the nodes includes the step upon a node j receiving the message $e_i[m]$, decoding the time value m and determining that the node i was the processor that sent the message.

7. A method according to claims 1 or 2, wherein at any given real time, the difference between the times of the local clocks of any two processor nodes is bound by a constant.

8. A method according to claim 4, wherein the gap between the time at which the first node starts a new clock and the last node starts a new clock is less than a constant multiple of the network message transit and processing time.

* * * * *